United States Patent [19]
Castellana et al.

[11] 3,786,228
[45] Jan. 15, 1974

[54] ELECTRIC SOLDERING IRON TIP
[75] Inventors: Frank S. Castellana, New York, N.Y.; Jack Liker, Wayne, N.J.; Steve Kokolis, Staten Island, N.Y.
[73] Assignee: Karl Roesch Inc., New York, N.Y.
[22] Filed: Dec. 15, 1971
[21] Appl. No.: 208,309

[52] U.S. Cl............ 219/233, 29/195 M, 29/473.1, 219/228, 219/540, 228/54
[51] Int. Cl. ...................... H05b 3/10, B23k 3/02
[58] Field of Search................. 219/221, 227–241, 219/530, 540; 29/195 A, 195 M, 473.1; 228/51–55

[56] References Cited
UNITED STATES PATENTS

| 3,537,886 | 11/1970 | Rively et al.................. 219/275 X |
| 3,481,638 | 12/1969 | Dryden......................... 29/473.1 |
| 2,796,507 | 6/1957 | Young............................ 219/233 |
| 3,136,878 | 6/1964 | Staller....................... 219/229 UX |
| 2,848,801 | 8/1958 | Eber............................ 29/195 M |
| 3,576,969 | 5/1971 | Surty et al. ................... 219/221 |
| 3,230,338 | 1/1966 | Kawecki..................... 219/238 X |

Primary Examiner—A. Bartis
Attorney—Charles E. Baxley

[57] ABSTRACT

An electric soldering iron tip includes a U-shaped metallic heating member formed from an elongated strip of Kovar or other low expansion iron-nickel alloys. The base portion of the U-shaped heating member has an elongated strip of ceramic material, such as beryllium oxide, attached to one side thereof for receiving heat from the heating member and forming a soldering surface for engaging the work to be soldered in order to apply heat thereto for soldering purposes. A second ceramic strip, formed of alumina, is connected to the opposite side of the base portion of the heating member from the first ceramic strip for preventing deformation of the tip due to differences in the coefficients of expansion of the first ceramic strip and the heating member to which it is attached. The ceramic strips are brazed to the heating member to provide a strong bond having excellent thermal conductivity characteristics. The arm sections of the U-shaped heating member are adapted to be connected to a source of electrical energy to effect flow of heating current through the member.

12 Claims, 3 Drawing Figures

PATENTED JAN 15 1974  3,786,228

ELECTRIC SOLDERING IRON TIP

BACKGROUND OF THE INVENTION

Conventional soldering irons generally have heat-applying tips formed of copper or alloys of copper which are selected because of their high thermal conductivity, and their ability to be wetted by tin which forms the base material for most types of solder. Certain disadvantages result from the use of copper working tips among which are in that the copper corrodes readily in the presence of most soldering fluxes, it abrades easily because of its softness and it oxidizes rapidly when heated to moderately high temperatures. In an effort to overcome these difficulties, working tips have been formed of iron or steel, but this results in a device wherein the working tip has a thermal conductivity which is substantially less than copper.

In the past, these deficiencies of soldering irons have been regarded as giving rise to a mere inconvenience, but in more recent applications of soldering irons, such as their use for soldering integrated circuits, various requirements render copper working tips unusable. That is, in soldering the leads on an integrated chip it is necessary to use a nonwettable electrically insulated working tip, which desirably can be mounted in a soldering machine. Thus an example of a recently developed soldering tip makes use of a tantalum metal element coated with a nonwettable, non-conductive tantalum oxide film. However, this tantalum soldering tip is relatively expensive and it has a relatively short life due to film breakdown.

Accordingly, it is one object of this invention to provide a reliable and releatively inexpensive soldering tip having a nonwettable and electrically insulated surface for applying heat to electrical contacts or for other soldering tasks.

A further object of this invention is to provide such a tip having good thermal conductivity, and being adaptable for use in soldering machines.

SUMMARY OF THE INVENTION

Disclosed herein is a soldering device having a ceramic heat-applying tip, and a method of manufacturing the soldering device wherein the ceramic tip is metallized on one surface and brazed to a metallic heating member.

In one embodiment of the invention a U-shaped metallic heating member is provided having a strip of electrical insulating ceramic material of good thermal conductivity fixed to the lower surface thereof, wherein the strip of ceramic material is used for contacting the surface to be soldered. Preferably, a second strip of ceramic material is fixed to the upper surface of a bight-portion of the U-shaped heating member for preventing deformation of the heating member due to differences between the respective coefficients of expansion of the metallic heating member and the ceramic heat applying tip.

The method of the invention pertains to the procedures used in attaching the ceramic strips to the metallic member, and comprises the steps of metallizing one surface of the ceramic strips and subsequently brazing that surface to the metallic heating member. It has been found that beryllium oxide forms an excellent heat-applying ceramic strip, and that vapor deposition or use of molybdenum-manganese (followed by nickel plating) are employed to deposit a metal film on the surface of the ceramic strip. Thus, for example, the ceramic strip may be coated with molybdenum-manganese, and then heated at a temperature of about 1500° C. in a reducing atmosphere. It has been found also that an iron-nickel-cobalt alloy, known to industry as "Kovar" (and containing preferably 54 percent iron, 28 percent nickel and 18 percent cobalt) forms an excellent material for the heating member, in that it satisfies all of the necessary heat-generating requirements, while also having a coefficient of expansion whicl resembles that of beryllium oxide at normal soldering temperatures. Other known low-expansion iron-nickel alloys could also be used in this service.

In a second embodiment of the invention a plate of ceramic material such as beryllium oxide is sandwiched between a pair of heating plates for example of Kovar, and the ceramic plate extends outwardly of the metallic plates to provide an elongated heat-applying surface for soldering purposes. Again, all surfaces of the ceramic material which contact the heating plates are metallized and brazed thereto. The heating plates at opposed surfaces of the ceramic plate provide a balanced configuration to prevent deformation of the structure, which deformation would otherwise occur due to differences in coefficients of expansion between the heating member and the ceramic plate.

BRIEF DESCRIPTION OF THE DRAWINGS

The accompanying drawings illustrate preferred embodiments of the invention. In such drawings.

DETAILED DESCRIPTION OF THE PREFERRED EMBODIMENTS

Figure 1:
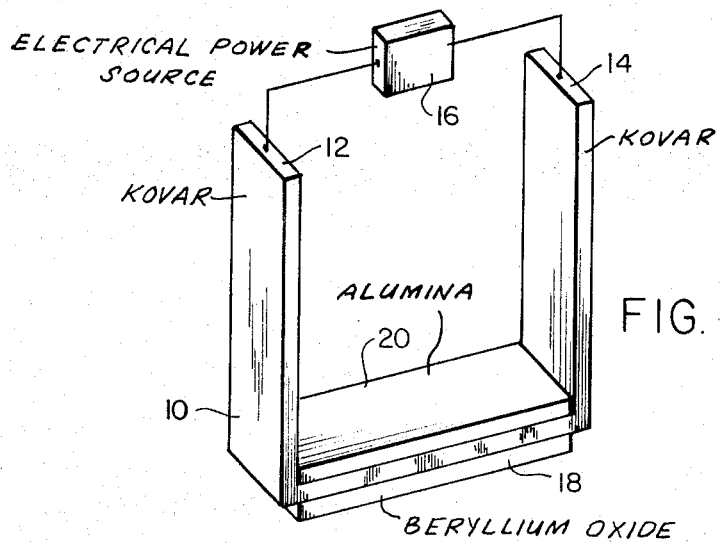
FIG. 1 is an isometric view of one embodiment of a soldering device according to the invention.

As shown in FIG. 1, a U-shaped metallic heating member 10 comprising a metal rod is provided and has a base section 20 and two arm sections extending outwardly from opposite ends of the base section to define the U configuration. The arm sections have respective free-end portions 12 and 14 connected to a potential source 16 for applying an electric current to the metallic heating member 10 in order to heat it to a temperature required for soldering procedures.

Soldering techniques as applied to integrated circuits in the electronics field require a soldering tip which is nonwettable, and which provides an electrically insulated surface for contacting the components of the integrated circuits. These characteristics are necessary to prevent contamination of the electrodes of the devices being soldered, and to prevent any possibility of applying a voltage to the components while they are being soldered. That is, for example, if a metallic heat-applying tip were used, there would be some risk of destroying or damaging the electronic components due to a static voltage applied to the electrodes of the components by the metallic tip. Accordingly, the soldering device of this invention includes a ceramic heat-applying tip in the form of an elongated strip of ceramic material 18 fixed to the heating member 10 for conducting heat energy generated by the heating member to the metallic workpieces, such as electrodes, which are to be soldered. As shown in FIG. 1, the ceramic strip 18 comprises an elongated member having a bonding surface bonded to the heating member 10 and an exposed workpiece contacting surface for simultaneously contacting a plurality of conductor pads on an integrated chip, and thus the illustrated device is well adapted for use in a soldering machine of the automatic or semi-automatic type known in the industry.

The elongated nature of the ceramic strip 18 give rise to possibility of deformation during use, due to differences in coefficients of expansion between the ceramic tip and the metallic heating member. According to this invention such deformation is prevented by applying a second elongated strip of ceramic material 20 to the upper or inner surface of the base section of the U-shaped heating member so that any tendency toward deformation due to differences in coefficients of expansion is counteracted by the opposed ceramic strips 18 and 20.

It has been found that beryllium oxide provides an excellent ceramic material for the heat-applying tip 18, while Kovar satisfies the heating requirements for the heating member 10 and has a coefficient of expansion characteristic which approximates that of beryllium oxide. Also according to this invention, the upper ceramic strip 20 preferably comprises an alumina material having a lower thermal conductivity than beryllium oxide, so that the heat is directed downwardly through the beryllium oxide strip. On the other hand, the coefficients of expansion of alumina and beryllium oxide are substantially identical so that all tendencies toward deformation, as described above, are overcome.

Figure 2:
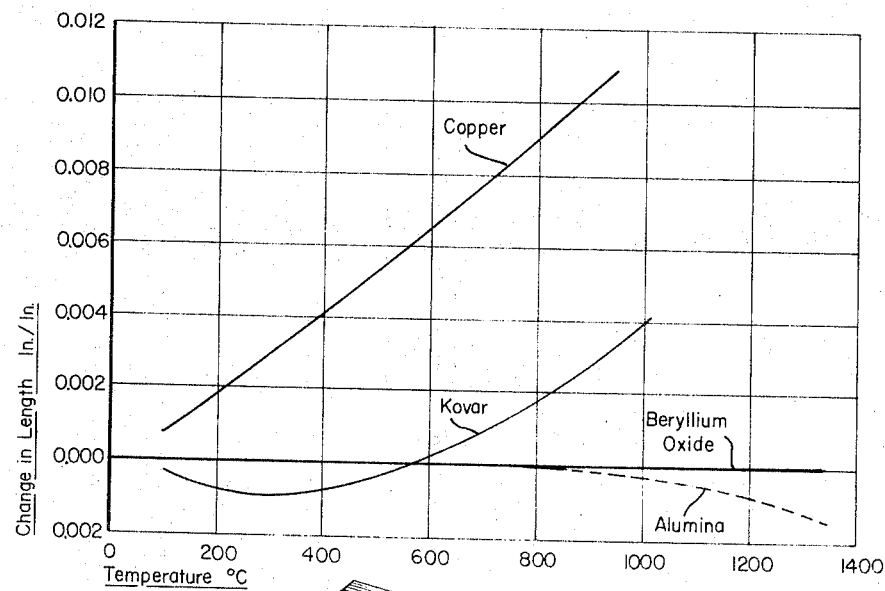
FIG. 2 is a graph showing expansion values at different temperatures for various materials.

FIG. 2 illustrates respective expansion values for the above-mentioned materials, together with copper, at various temperatures within the normal span of soldering temperatures; and, as is evident in FIG. 2, such expansion values for Kovar, beryllium oxide, and alumina, are of the same order of magnitude. However, while such expansion values are similar, the balancing concept herein necessary to counteract any possibility of deformation when the soldering device is applied for precise use in soldering minute integrated circuits.

Figure 3:
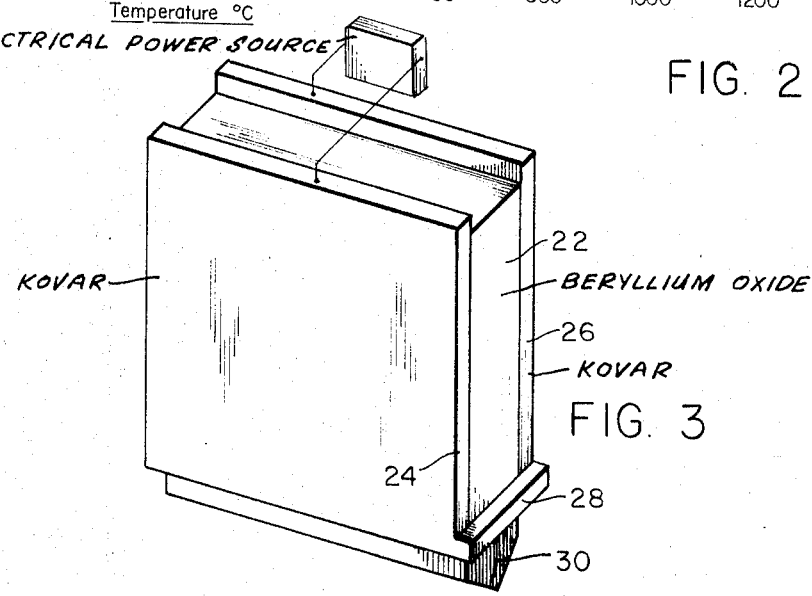
FIG. 3 is an isometric view of a second embodiment of a soldering device according to the invention.

In a second embodiment of the invention, as illustrated in FIG. 3 of the drawing, a metal-to-ceramic-to-metal laminate is provided by a ceramic plate 22, preferably formed of beryllium oxide, and a pair of metal plates 24 and 26 fixed to opposed surfaces of the ceramic plate. Again the opposed plates of metal are preferably formed of Kovar and may be connected to a potential source for providing a heating current to the plates. As illustrated at 28, the plates are conductively interconnected at their lower ends, at the edge portions of the ceramic plate 22, thus providing a continuous path for the heating current. The ceramic plate 22 projects outwardly from the ends of the metallic plates thereby providing a heat-applying surface 30, whereby the structure shown in FIG. 3 is also well adapted to use with automatic soldering machines.

In order to provide an intimate bond between the ceramic materials and the metallic heating members, according to this invention, the surfaces of the ceramic materials which contact the heating members are preliminarily metallized and then brazed to the heating members to provide a strong bond having excellent thermal conductivity characteristics.

For example, the metallizing process can be performed by vapor deposition of a metal coating on the ceramic surface. Specifically, in the case of alumina the metallizing procedure may be performed by cleaning the alumina strip as by firing it at 1,000° C., and then applying a molybdenum-manganese coating to the brazing surface of the ceramic strip, followed by a second firing of the coated strip of about 1,500° C. to fuse the metal coating to the alumina ceramic. A subsequent plating of the coated strip with a thin layer of a metal such as nickel, copper or gold provides a good brazing surface, whereupon the metallized strip is then brazed to the heating element.

It will be understood by those familiar with soldering equipment that wide deviations may be made from the above-described preferred embodiments, without departing from the main theme of invention specified in the claims which follow.

I claim:

1. A soldering device for use in soldering metallic workpieces comprising: an elongated solid heating member composed of a metal strip having thermally conductive and electrically conductive properties and having terminal end portions connectable during use of the soldering device to a source of electrical energy to effect current flow through said heating member accompanied by the generation of heat energy due to the current flow; and means for conducting heat energy away from said heating member and applying same to metallic workpieces to be soldered during use of the soldering device comprising an elongated ceramic strip having thermally conductive and electrically insulative properties and having an elongated planar bonding surface disposed in superposed substantially coextensive relationship with respect to an elongated surface portion of said heating member intermediate said terminal end portions and an exposed elongated planar workpiece-contacting surface adapted to contact the metallic workpieces to be soldered to apply heat energy thereto, and means defining a thermally conductive bond effectively bonding said surface portion of said heating member to said bonding surface of said ceramic strip to effect conduction of heat energy away from said heating member through said thermally conductive bond to said ceramic strip to effectuate heating of said workpiece-contacting surface.

2. A soldering device according to claim 1; including another elongated ceramic strip having thermally conductive and electrically insulative properties bonded to another elongated surface portion of said heating member and extending along said heating member in direct spaced-apart opposition from said first-mentioned ceramic strip to effectively counteract deformation forces resulting from differences in the coefficients of expansion between said heating member and said first-mentioned ceramic strip.

3. A soldering device according to claim 2; wherein said another ceramic strip is composed of a material having a lower thermal conductivity than that of said first-mentioned ceramic strip so that heat energy generated by said heating member is directed towards said first-mentioned ceramic strip.

4. A soldering device according to claim 3; wherein said first-mentioned ceramic strip is composed of beryllium oxide.

5. A soldering device according to claim 4; wherein said another ceramic strip is composed of alumina.

6. A soldering device according to claim 5; wherein said heating member is composed of an alloy consisting essentially of about 54 percent iron, about 28 percent nickel and about 18 percent cobalt.

7. A soldering device according to claim 2; wherein both said first-mentioned surface portion of said heating member to which said first-mentioned ceramic strip is bonded and said another surface portion of said heating member to which said another ceramic strip is bonded have a planar configuration whereby said first-mentioned ceramic strip, said heating member, and said another ceramic strip jointly comprise a layered structure.

8. A soldering device according to claim 2; wherein said means defining a thermally conductive bond comprises a metallized coating disposed on said bonding surface of said ceramic strip and brazed to said surface portion of said heating member.

9. A soldering device according to claim 1; wherein said heating member comprises a metal rod having a generally U-shaped configuration defined by an elongated base section, and two arm sections extending outwardly in the same direction from opposite ends of said elongated base section and connectable to the source of electrical energy during use of the soldering device; wherein said elongated ceramic strip extends along and is bonded to the outer portion of said elongated base section corresponding to the outer base portion of the U; and another elongated ceramic strip having thermally conductive and electrically insulative properties extending along and bonded to the inner portion of said elongated base section corresponding to the inner base portion of the U to effectively counteract deformation forces resulting from differences in the coefficients of expansion between said heating member and said first-mentioned elongated ceramic strip.

10. A soldering device according to claim 9; wherein said another ceramic strip is composed of a material having a lower thermal conductivity than said first-mentioned ceramic strip so that heat energy generated by said heating member is directed towards said first-mentioned ceramic strip.

11. A soldering device according to claim 9; wherein said first-mentioned ceramic strip extends only linearly along said heating member.

12. A soldering device according to claim 9; wherein said first-mentioned ceramic strip is composed of beryllium oxide and said another ceramic strip is composed of alumina.

* * * * *